(12) United States Patent
Adams

(10) Patent No.: US 8,480,109 B1
(45) Date of Patent: Jul. 9, 2013

(54) BELT DRIVE SYSTEM

(75) Inventor: Richard J. Adams, Boulder, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/596,200

(22) Filed: Aug. 28, 2012

(51) Int. Cl.
*B62M 9/02* (2006.01)

(52) U.S. Cl.
USPC .......................................................... 280/261

(58) Field of Classification Search
USPC ................... 280/261; 198/834; 474/153, 148, 474/205, 152; 305/115
See application file for complete search history.

(56) References Cited

U.S. PATENT DOCUMENTS

| | | | |
|---|---|---|---|
| 438,124 A | 10/1890 | Warwick | |
| 585,416 A | 6/1897 | Wattles | |
| 3,338,107 A | 8/1967 | Kiekhaefer | |
| 3,472,563 A * | 10/1969 | Irgens | 305/112 |
| 3,888,132 A * | 6/1975 | Russ, Sr. | 474/153 |
| 4,072,062 A * | 2/1978 | Morling et al. | 198/834 |
| 4,099,737 A * | 7/1978 | Waugh | 280/261 |
| 4,119,326 A | 10/1978 | Porter | |
| 4,634,409 A | 1/1987 | Johnson et al. | |
| 4,846,489 A | 7/1989 | Kleinebenne | |
| 6,848,757 B2 * | 2/2005 | Ueno | 305/115 |
| 7,144,345 B2 | 12/2006 | Edamatsu et al. | |
| D544,894 S | 6/2007 | Clarke | |
| D545,333 S | 6/2007 | Clarke | |
| 7,235,028 B2 * | 6/2007 | Martin et al. | 474/264 |
| 7,254,934 B2 | 8/2007 | Wu | |
| D592,107 S | 5/2009 | Clarke | |
| 8,136,827 B2 * | 3/2012 | Lumpkin | 280/261 |

* cited by examiner

*Primary Examiner* — Tashiana Adams
(74) *Attorney, Agent, or Firm* — J. A. Thurnau, Esq.; P. N. Dunlap, Esq.

(57) ABSTRACT

A pulley and drive belt system comprising a drive belt and at least one pulley configured to engage a surface of the drive belt, the at least one pulley comprising, a frame configured to rotate about a rotation axis, the frame having a circular outer rim with opposing sides, a plurality of circumferential teeth extending radially and axially of the rim, each tooth having a tooth width and each tooth being configured to be received between adjacent lugs of the drive belt, and an alignment member having a wire form and extending between adjacent circumferential teeth tops, and the alignment member extending no further radially from the rotation axis than the circumferential teeth, a debris ejecting opening disposed radially inward of the alignment member between the circumferential teeth.

24 Claims, 10 Drawing Sheets

US 8,480,109 B1

BELT DRIVE SYSTEM

TECHNICAL FIELD

Belt drive systems and more particularly belt drive systems for cycles.

BACKGROUND

The overwhelming majority of cycles, including motorcycles and bicycles, made, sold and used throughout the world utilize a drive train with a conventional chain providing power between a first pulley operatively associated with a drive shaft and a second pulley operatively associated with a hub of a rear wheel. In bicycle applications, the first pulley is operatively associated with a crank set. Such chains are relatively effective at transmitting power between the first and second pulleys, but they are not without shortcomings. The shortcomings include, but are not limited to, the need to periodically be lubricated, the fact that with wear the chains become less efficient in transmitting power, debris can lodge between chain links diminishing efficiency, the chains stretch with extended use and need to be periodically replaced and may further wear the teeth of the first or second pulleys requiring their replacement as well and chains can be noisy.

One known alternative to chain-based drive train systems are belt drive train systems. Belt drive systems overcome a number of the problems discussed above, but are not without their own problems. For example, belt drive systems generally require relatively precise alignment between first and second pulleys of the belt drive system. Providing such alignment can be difficult particularly in bicycles, where crank sets and hubs of various manufacturers can be mixed and matched in bicycle assembly, resulting in less than precise alignment. In addition, incidents may happen during use of the bike that degrades the alignment. As a result of a loss of a precise alignment, the belts of known belt drive systems can wander relative to the pulley and fall off the pulley. This problem is exacerbated because the belts and pulleys are relatively narrow relative to the belt length. One known way of addressing this misalignment is to provide one or more radially extending side members around the circumference of the pulley to prevent the belt from wandering off the pulley. However, such side members, particularly where two side members are provided, complicate the manufacture of the pulley, increase weight, make the pulley wider and increases the cost of the pulleys. A further problem with known belt drive systems is collection of debris between teeth of the pulleys which can interfere with effective force transmission and, in extreme cases, cause a belt to slip off a pulley. Each of these disadvantages is significant for cycle applications and particularly bicycle applications.

The various embodiments described herein are intended to overcome one or more of the problems discussed above.

SUMMARY OF THE EMBODIMENTS

A first aspect is a pulley and drive belt system comprising, a drive belt, the drive belt comprising a plurality of longitudinally spaced lugs each having an alignment groove dividing the lug into first and second lug segments, the alignment groove having an alignment groove depth, and at least one pulley configured to engage a surface of the drive belt, the at least one pulley comprising, a frame configured to rotate about a rotation axis, the frame having a circular outer rim with opposing sides, a plurality of circumferential teeth extending radially and axially of the rim, each tooth having a tooth width and each tooth being configured to be received between adjacent lugs of the drive belt, and an alignment member having an elongate endless form and extending between adjacent circumferential teeth tops, the alignment member being configured to be received in the alignment groove, and the alignment member extending no further radially from the rotation axis than the circumferential teeth, a debris ejecting opening disposed radially inward of the alignment member between the circumferential teeth, the circumferential teeth, the alignment member and the alignment groove being configured so that with the alignment member received in the alignment groove, the drive belt rides on the circumferential teeth.

Yet another aspect is a self-aligning pulley and drive belt system comprising, a drive belt, the drive belt comprising a plurality of longitudinally spaced lugs each having an alignment groove dividing the lug into first and second lug segments, the alignment groove having an alignment groove depth, and at least one pulley configured to engage the drive belt, the at least one pulley comprising, a frame configured to rotate about a rotation axis, the frame having a circular outer rim with opposing sides, a plurality of circumferential teeth extending radially and axially from the rim, each tooth having a tooth width parallel to the rotation axis, and each tooth being configured to be received between adjacent lugs of the drive belt, an endless alignment member extending between adjacent circumferential teeth, the alignment member being configured to be received in the alignment groove, and the alignment member radially disposed a distance that extends the alignment member into the alignment groove a distance no greater than the alignment groove depth, and a debris ejecting opening disposed radially inward of the alignment member between the circumferential teeth.

Yet another aspect is a bicycle comprising, a crank set, a rear wheel hub, and a pulley and drive belt system operatively associated with the crank set and the rear wheel hub, the pulley and drive belt system comprising, a drive belt, the drive belt comprising a plurality of longitudinally spaced lugs each having an alignment groove dividing each lug into first and second lug segments, a first pulley configured to engage the surface of the drive belt, the first pulley comprising, a frame configured for connection to the bicycle crank set for rotation about a rotation axis, the frame having a circular outer rim with opposing sides, a plurality of circumferential teeth extending radially and axially of the rim, the teeth extending axially a tooth width at least equal to a width of the drive belt, and each tooth being configured to be received between adjacent lugs of the drive belt, a second pulley configured to engage the surface of the drive belt, the second pulley comprising, a frame configured for connection to the bicycle wheel hub for rotation about a rotation axis, the frame having a circular outer rim with opposing sides, a plurality of circumferential teeth extending radially and axially of the rim, the teeth extending axially a tooth width at least equal to a width of the drive belt, and each tooth being configured to be received between adjacent lugs of the drive belt, and at least one of the first and second pulleys further comprising an alignment member having a cylindrical form extending between adjacent circumferential teeth, the alignment member being configured to be received in the alignment groove, a debris ejecting opening disposed radially inward of the alignment member between the circumferential teeth.

Yet another aspect is a pulley for use with a drive belt, the drive belt comprising a plurality of longitudinally spaced lugs each having an alignment groove dividing each lug into first and second lug segments, the pulley comprising, a frame configured to rotate about a rotation axis, the frame having a circular outer rim with opposing sides, a plurality of circumferential teeth extending radially and axially of the rim, each tooth having a tooth width at least equal to a width of the drive belt, and each tooth being configured to be received between adjacent lugs of the drive belt; and an alignment member having a wire form extending between adjacent circumferential teeth, the alignment member being configured to be received in the alignment groove, the alignment member extending radially no further than the circumferential teeth from the rotation axis, a debris ejecting opening disposed radially inward of the alignment member between the circumferential teeth.

Yet another aspect is a kit for a bicycle comprising a drive belt, the drive belt comprising a plurality of longitudinally spaced inner lugs each having a an alignment groove dividing each lug into first and second lug segments, alignment groove having an alignment groove depth, and a first and a second pulley, each of the first and second pulleys being configured to engage a surface of the drive belt, at least one of the first and second pulleys comprising, a frame having a circular outer rim with opposing sides, a plurality of circumferential teeth extending radially and axially of the rim, each tooth having a width parallel to the rotation axis, and each tooth being configured to be received between adjacent lugs of the drive belt, and a cylindrical alignment member extending between adjacent circumferential teeth, the alignment member being configured to be received in the alignment groove, and the alignment member extending no further radially than the circumferential teeth from the rotation axis, the circumferential teeth, the alignment member and the alignment groove being configured so that with the alignment member received in the alignment groove, the drive belt rides on the circumferential teeth.

DETAILED DESCRIPTION

Unless otherwise indicated, all numbers expressing dimensions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

The belt drive system disclosed herein can have application to a wide variety of apparatus utilizing belt drives, including, but not limited to, cycles such as motorcycles and bicycles. Because of the particular advantages of the belt drive system for use with bicycles, the belt drive system is illustrated in use with a bicycle. This specific embodiment is intended to be non-limiting unless expressly limited by the scope of the attached claims.

Figure 1:
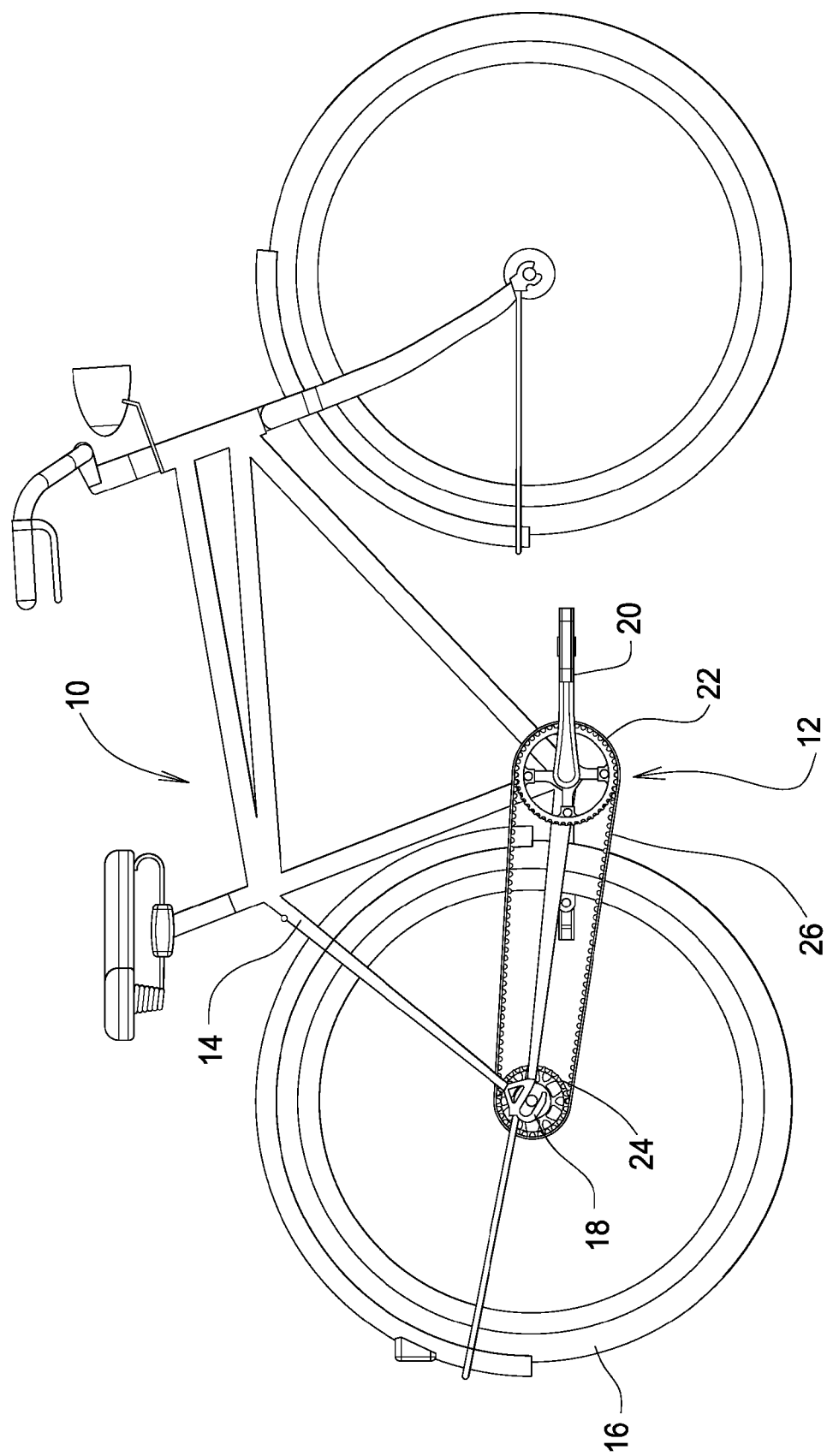
FIG. 1 is a schematic plan view of a cycle, in particular a bicycle including a pulley and drive belt system.

A bicycle 10 having a drive belt system 12 is schematically illustrated in FIG. 1. The bicycle 10 includes a frame 14 with a rear wheel 16 having a hub 18 attached to the frame by a rear drop out (not shown). The bicycle 10 further includes a crank set 20. The belt drive system 12 includes a first pulley 22, which is operatively associated with the crank set 20 to rotate about a common rotation axis with the crank set 20. A second pulley 24 is operatively associated with the rear wheel hub 18 to rotate about a common rotation axis. A synchronous drive belt 26 extends between the first pulley 22 and the second pulley 24. As illustrated in FIG. 1 the first pulley 22 may have a diameter greater than the second pulley. In other embodiments the pulleys may be of the same size or the second pulley may have a diameter greater than the first pulley. In addition, one or more additional coaxial pulleys may be provided adjacent the first or second pulley to provide for varying gear ratios. Such an embodiment may further include a front or rear derailleur to enable shifting between adjacent pulleys. Or gearing may be provided by means of geared rear hub of the type known in the art.

Figure 2:
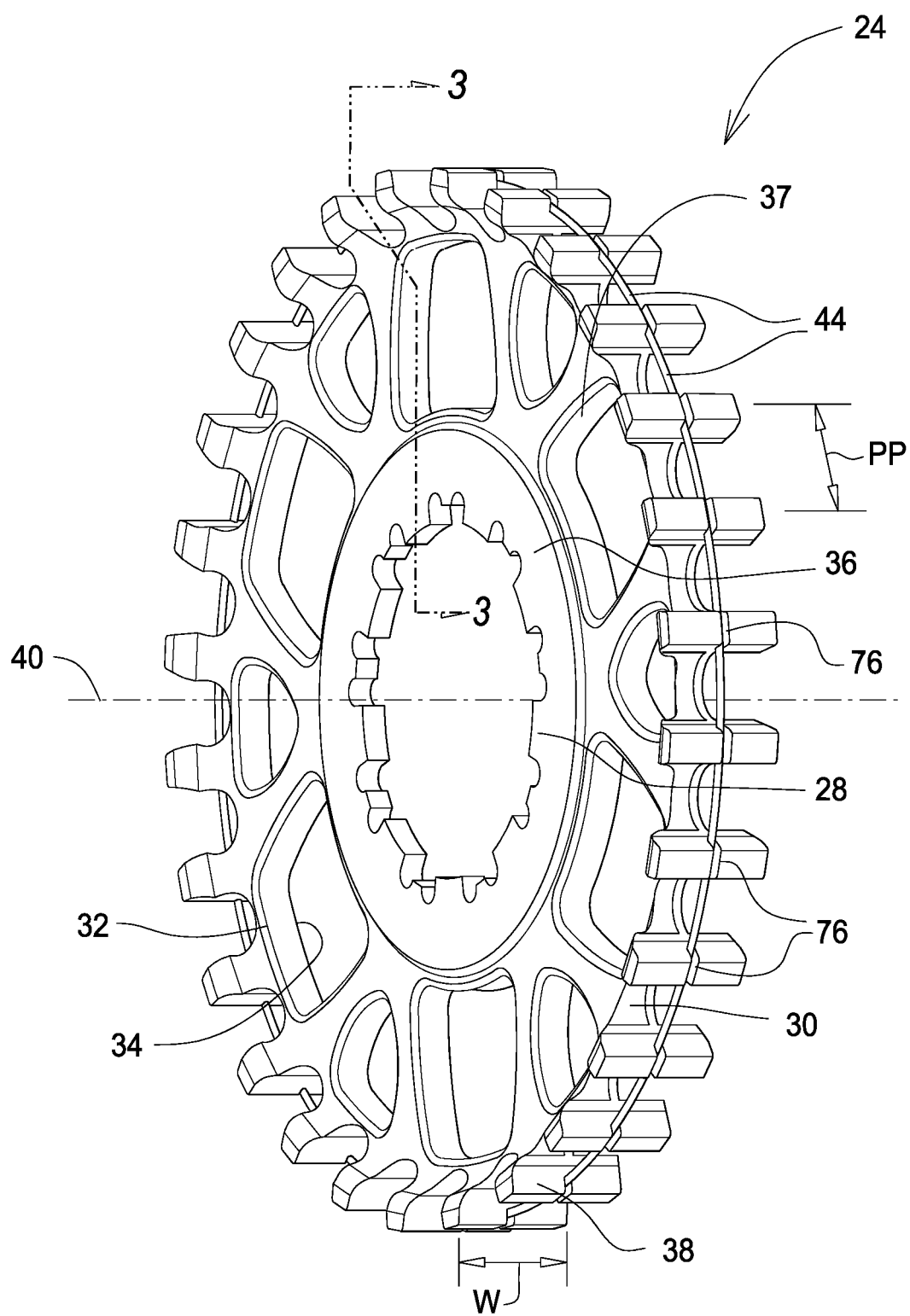
FIG. 2 is a perspective view of the second pulley of FIG. 1.

FIG. 2 is a perspective view of the second pulley 24 removed from the hub 18 and the belt drive system 12. The second pulley 24 comprises a frame 28 configured for connection to the hub 18 of the rear wheel 16 and includes a circular outer rim 30 with opposing sides 32, 34, a hub connection ring 36 and a plurality of spokes 37 extending between the hub connection ring 36 and the circular outer rim 30. The second pulley 24 further comprises a plurality of circumferential teeth 38. As illustrated, the circumferential teeth are evenly spaced at a pulley pitch PP and extend radially and axially of the rim. In other embodiments, the teeth may have variable spacing to mate with a drive belt having variably spaced lugs.

Figure 5:
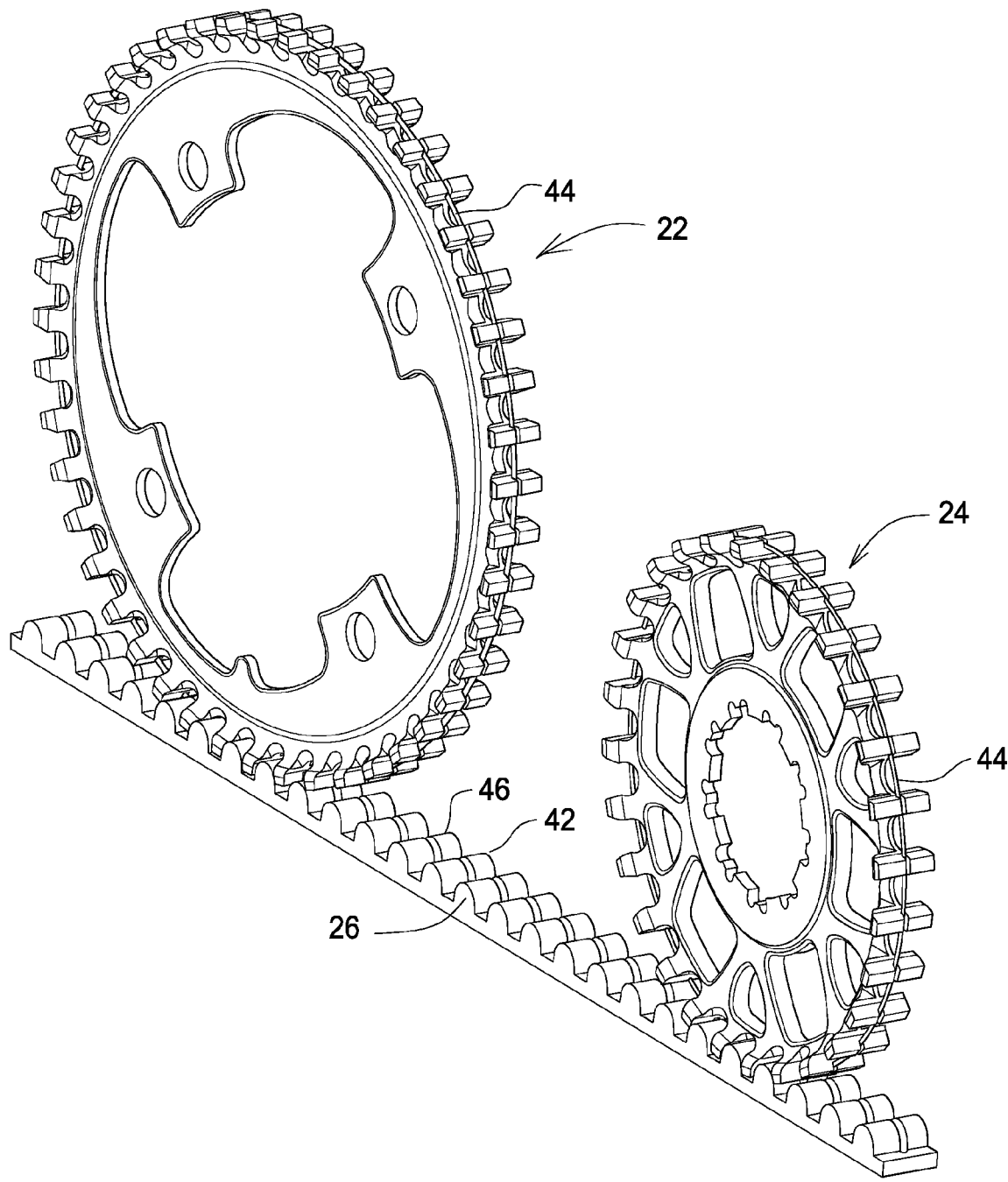
FIG. 5 is a perspective view of the first and second pulleys of FIG. 1 engaged with a drive belt.
Figure 6:
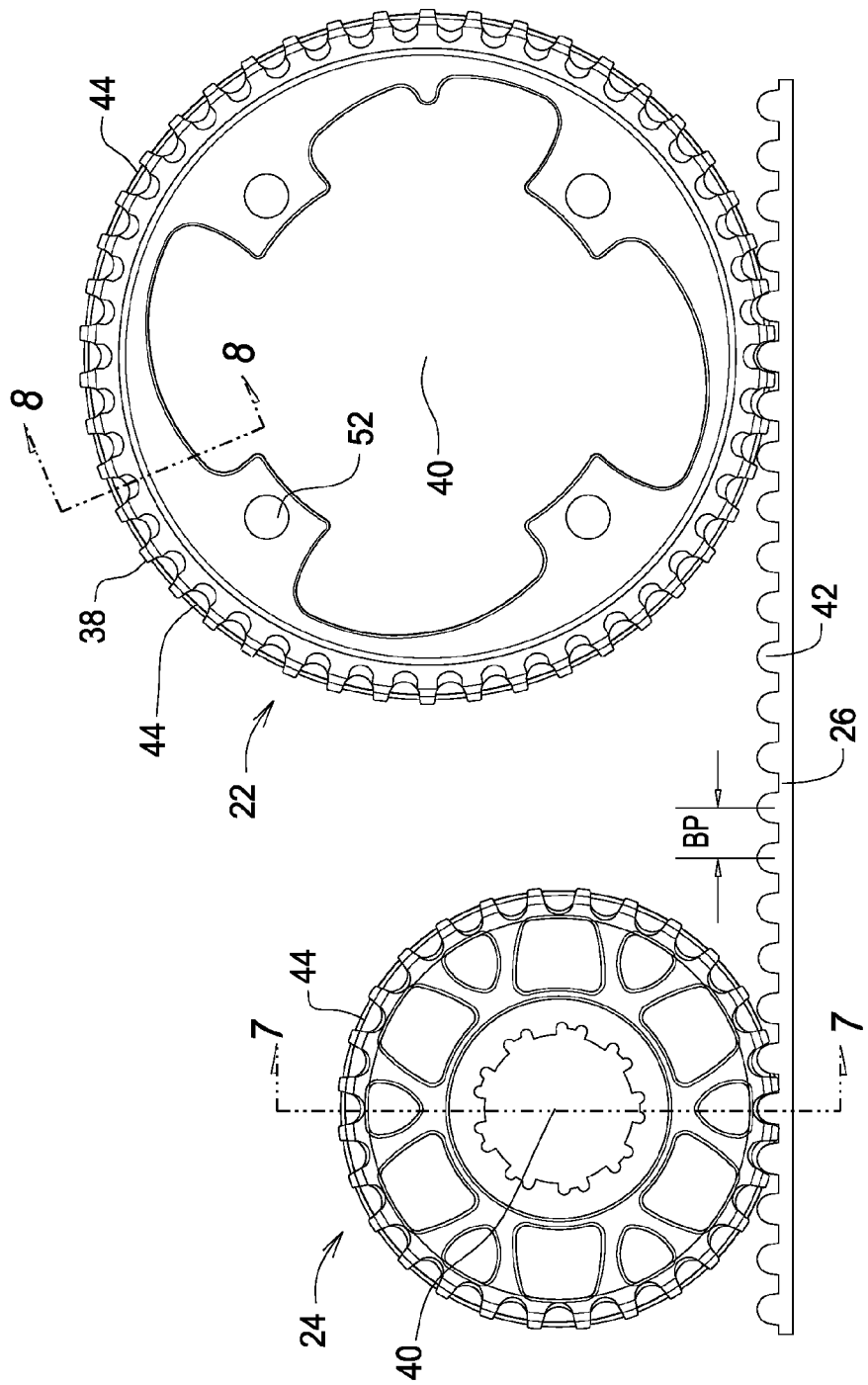
FIG. 6 is a side elevation view of the pulley and drive belt system of FIG. 5.

Each tooth further has a width (W) parallel to the rotation axis. The width W is at least equal to the width of the drive belt 26, though in some embodiments it may be equal, more or less than the width of the drive belt. It can be advantageous for the tooth width and belt width to be substantially equal to maximize the amount of force transmitted between the belt and teeth while minimizing the respective width of the belt and teeth. Each tooth 38 is configured to be received in a space between adjacent inner lugs 42 of a drive belt 26 as illustrated in FIGS. 5 and 6. In some embodiments, as illustrated in FIGS. 5 and 6, the teeth substantially fill the space between adjacent lugs. This feature can be useful to minimize slippage between the belt and pulley if the direction of rotation of the pulley reverses. These inner lugs are spaced a belt pitch BP.

The second pulley 24 includes an alignment member 44 having an elongate endless form and extending between adjacent circumferential teeth. The alignment member 44 is configured to be received in an alignment groove 46 of the drive belt 26, which divides each lug into first and second lug segments. Alignment member 44 generally comprises a long, thin cylindrical form, for example, such as a piece of 19 gage steel wire. The alignment member preferably extends between the tops of adjacent sprocket teeth at a radius from a rotational axis that is substantially equal to the radius of the tops of the sprocket teeth. However, the alignment member may also extend between adjacent teeth at a radius that is less than the radius of the tops of the teeth, but generally greater than a radius that is at least one half the height of the teeth. See FIGS. 5-7. Member 44 is received in a tooth groove 76. In a particular embodiment alignment member 44 comprises a continuous steel wire loop which is "walked" on to the teeth during manufacture. Member 44 can be heated to expand the diameter in order to facilitate installation over the teeth. The loop is formed, for example, by spot welding together the ends of the length of wire. In another embodiment the alignment member 44 comprises a length of wire which is engaged with grooves 76. The "loose" ends of the wire are embedded in a groove 76 so they do not project in a manner that causes them to interfere with the belt. The ends may be engaged to the sprocket groove by a spot weld, adhesive or by press into an interference fit. The wire may be in the range of wire gage 14 (2.032 mm diameter) to wire gage 25 (0.5182 mm diameter), although these are only offered as examples and are not intended to limit the scope of the invention. Further, the wire may comprise stainless steel, steel, composite materials, or plastic. Member 44 may also comprise any suitable cross section besides cylindrical including but not limited to square, oval, hex, triangular and rectangular. Further, the alignment member need not comprise wire, but instead may comprise round stock, cylindrical stock, square stock or other metal stock.

Figure 7:
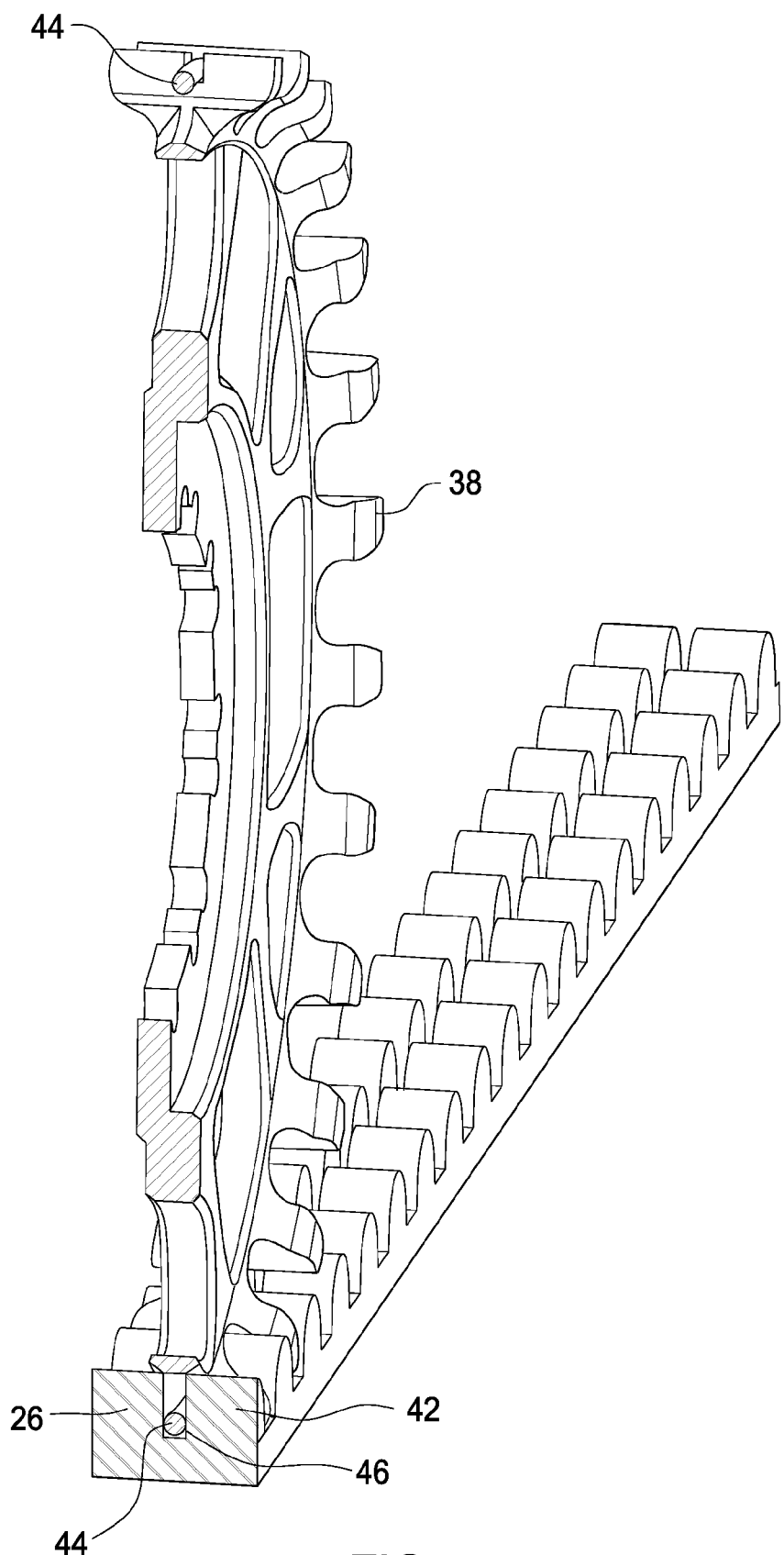
FIG. 7 is a cross-section of the second pulley of FIG. 6 taken along line 7-7 of FIG. 6.

Referring to FIG. 7, alignment groove 46 can have parallel side walls. In other embodiments the side walls can be tapered to facilitate receiving the alignment member 44 therein. In the illustrated embodiment and as seen in FIG. 7, the alignment groove 46 divides the lugs 42 into adjacent and equal first and second lug segments. However, the first and second lug segments could be of different widths in other embodiments. In the illustrated embodiment, each tooth of the second pulley 24 extends lengthwise an equal distance from each side of the rim. In embodiments where the first and second lug segments are of different widths, the teeth would generally have corresponding different widths.

In the illustrated embodiment, each tooth of the second pulley 24 extends radially beyond the alignment member 44 from the rotation axis 40 (see FIG. 6); though in other embodiments they can extend the same distance or the alignment member 44 could extend further. In some embodiments the circumferential teeth, the alignment member and the alignment groove are configured so that with the alignment member received in the alignment groove, the drive belt rides on the circumferential teeth. Alternatively, the circumferential teeth, the alignment member and the alignment groove may be configured to also ride on the alignment member.

Figure 9:
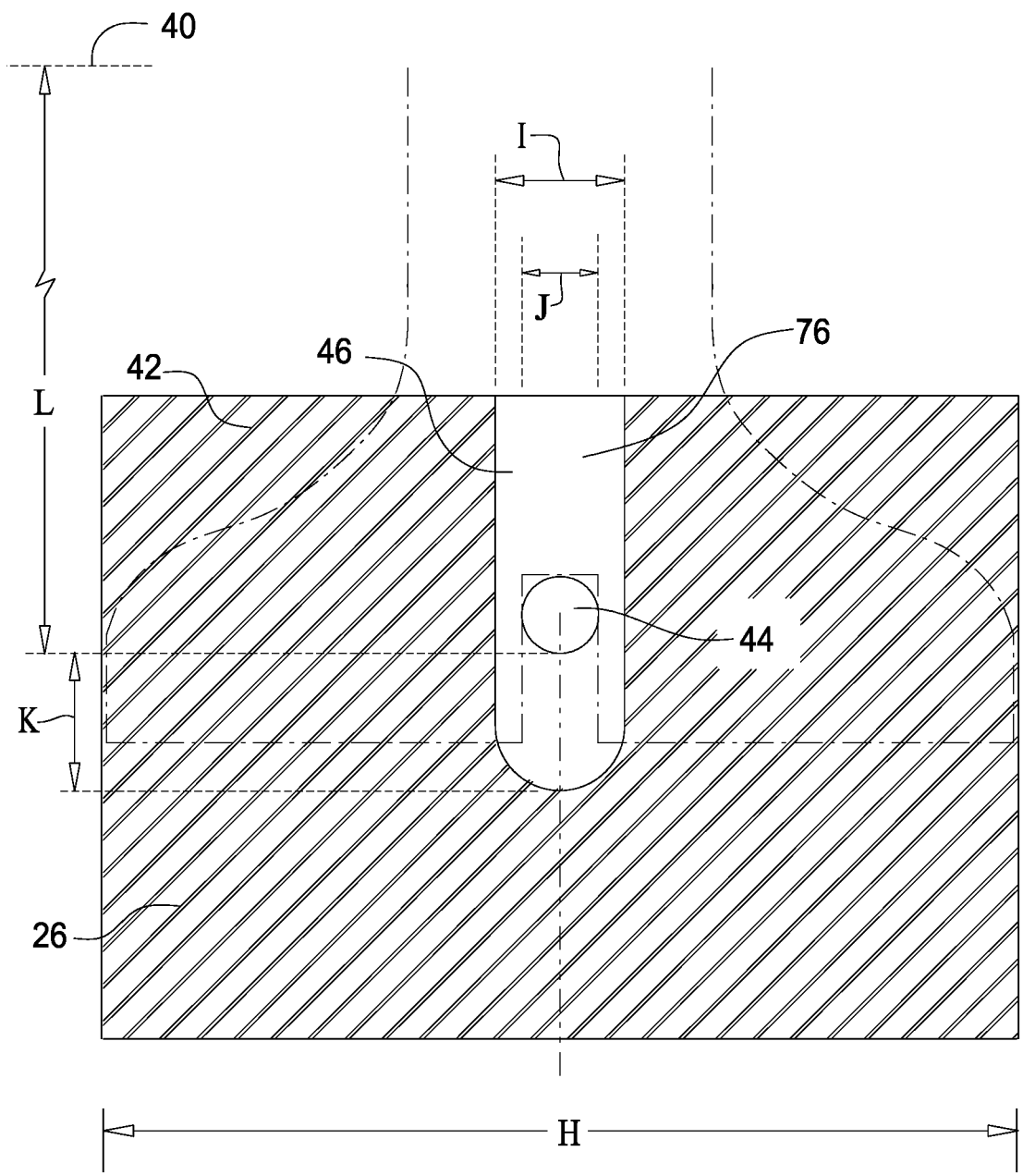
FIG. 9 is a cross-section of a belt lug-pulley tooth engagement.

FIG. 9 illustrates an embodiment wherein the alignment member comprises a cylindrical wire extending between adjacent teeth 38. In this embodiment the pulley has a width H of about 11 mm and the teeth have a width of about 11 mm. In most embodiments the width of the teeth is at least equal to the width of the belt. In FIG. 9, the alignment groove has a width I of about 1.5 mm and the alignment member has a width J of about 1.0 mm. Generally the alignment groove width is slightly wider than the alignment member width (J) to provide some engagement clearance, but should not be so much wider to allow the belt to wander an undesirable amount along the width of the teeth. Generally, the width of the alignment groove (I) is minimized to maximize the amount of belt surface available to engage the teeth and maximize the surface for force transmission therebetween. Minimizing the width of the alignment groove also minimizes the likelihood of debris entering the alignment groove. Assuming a belt width of about 11 mm, in some embodiments an alignment groove (I) width may be between about 1-3 mm, in other embodiments about 1-2 mm and in other embodiments about 1-1.5 mm. The alignment member generally would have a width of about 0.5 mm less than the alignment groove, but this is simply offered as an example and is not intended to limit the scope of the invention.

In some embodiments the ratio of the width of the alignment groove to the belt width can be as great as 1:3. In other embodiments it can be 1:4. In still other embodiments it can be 1:8, 1:10 or even smaller to a limit based upon the diameter of the alignment member 44. The ratio of the width of the alignment member to the width of the teeth can also be 1:3, 1:4, 1:10 or even smaller.

As seen in FIG. 9, the alignment member 44 is configured so that it does not extend to the bottom of the alignment groove. In the embodiment of FIG. 9 there is a distance (k) of about 0.75 mm between the alignment member and the bottom of the alignment groove. This configuration is useful where the belt and pulley drive system is used in an environment where debris may be present, such as mountain biking. This space provides for accumulation of some debris without filling the alignment groove and thereby possibly forcing the belt off the pulley. In other applications where debris accumulation is of little concern, the alignment member can be disposed between the tops of the sprocket teeth so it engages the full depth of the alignment groove. However, in most embodiments it is desirable that the alignment member not extend so far into the alignment groove that the belt rides on the alignment member and not on the surface of the pulley teeth.

Figure 8:
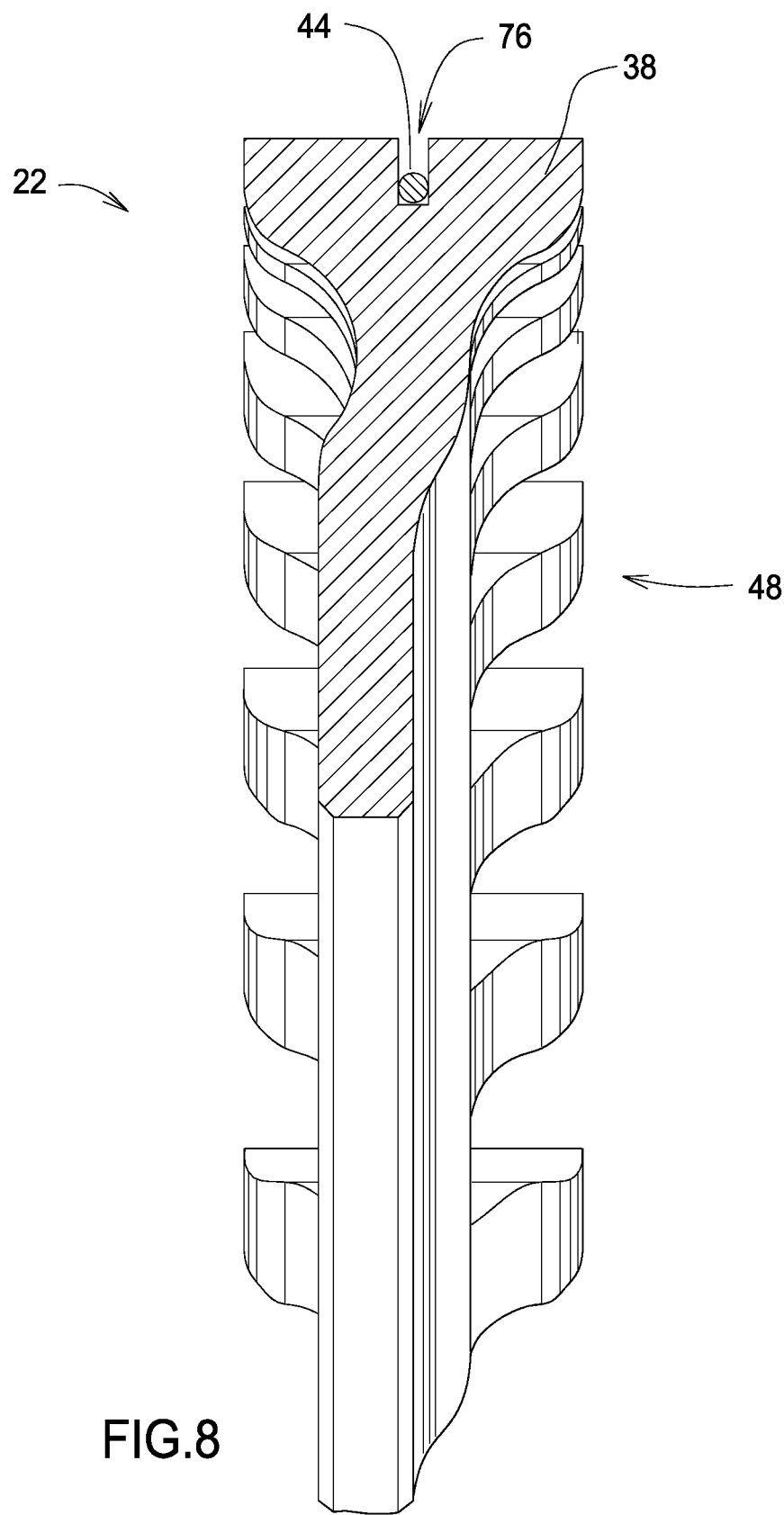
FIG. 8 is a cross-section of a segment of a pulley illustrating an axial offset.

Referring to FIG. 8, an axial offset 48 of a select distance (e.g., 2 mm) is provided between the connection ring 36 and the rim 30. In one embodiment, the offset 48 is provided between the connection ring 36 and the plurality of spokes 37 by a step as illustrated in FIG. 8. Alternatively, the offset may be provided by an angular offset or any other manner. The purpose of this offset is so that on attachment of the connection ring to the hub the position of the rim along the rotation axis can be varied depending on which of the opposing rim sides is leading during attachment.

The first pulley 22 has an identical configuration of the circular outer rim 30, teeth 38 and alignment member 44, but may be, as illustrated in FIG. 6, of a different diameter and further may include a different frame structure. Referring to FIGS. 5 and 6, the frame 50 of the first pulley 22 consists of a number of radially spaced inwardly extending brackets 52 that further form a means for operative association with the crank set. These brackets may have an offset in a like manner of the axial offset 48 illustrated in FIG. 8 with regard to the second pulley 24. The holes 54 provide for attachment to the crank set 20.

In some embodiments of a drive system as disclosed herein, only the first pulley 22 or the second pulley 24 may include an alignment member 44. It may also be desirable in some embodiments to not have an alignment member extend between all the adjacent teeth. In some embodiments, only a single pulley may be used with a drive belt.

In use in the particular application of a bicycle, lugs 46 of the synchronous drive belt 26 are received in the space between adjacent teeth of each of the first and second pulleys 22, 24, whereby the rear wheel can be driven by application of force to the crank set. Alignment is maintained on the first and second pulleys 22, 24 by the alignment member 44 mating with the alignment groove 46 of the belt. In this manner, side members or flanges required in conventional belt pulleys used on bicycles can be eliminated. This has the advantage of decreasing the width of the pulleys, which is critical with the small space available in bicycle assembly. Eliminating the side members further decreases the weight of the pulleys, another critical factor in bicycle design. The alignment feature allows for relative axial displacement (misalignment) between the first and second pulleys, which is common in bicycles where frames may not be built to exacting specifications and where damage may occur to the frame or pulleys which would otherwise cause pulleys to become out of alignment. Furthermore, bicycle manufactures may choose to use crank sets and wheel sets of various manufactures and the respective dimensions may vary somewhat, which could cause some misalignment of the pulleys. This potential misalignment can be compensated by providing the axial offsets in the first and second pulleys as described above and further by virtue of interaction of the alignment grooves and alignment members. These advantages can be enjoyed in other applications such as motor cycles or other devices utilizing belt drive systems.

Figure 3:
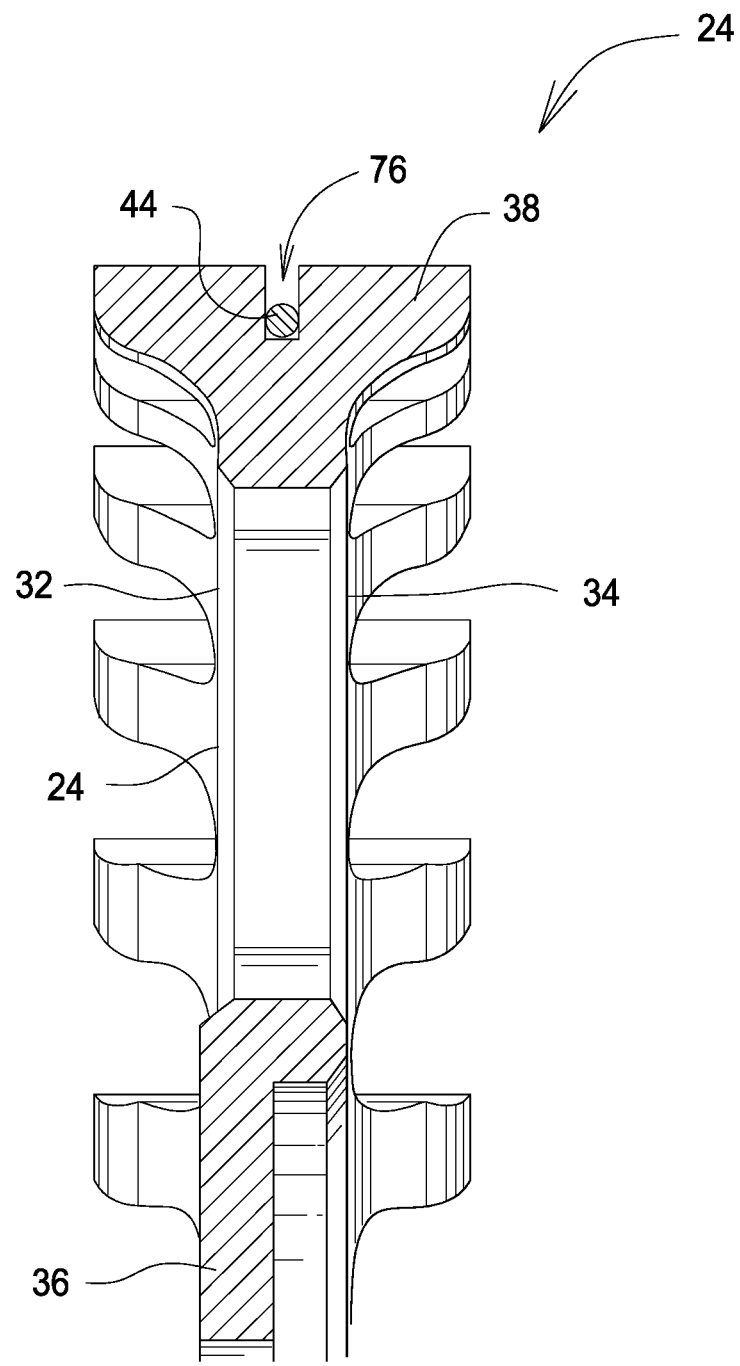
FIG. 3 is a cross-section of the second pulley of FIG. 2 taken along line 3-3.
Figure 4:
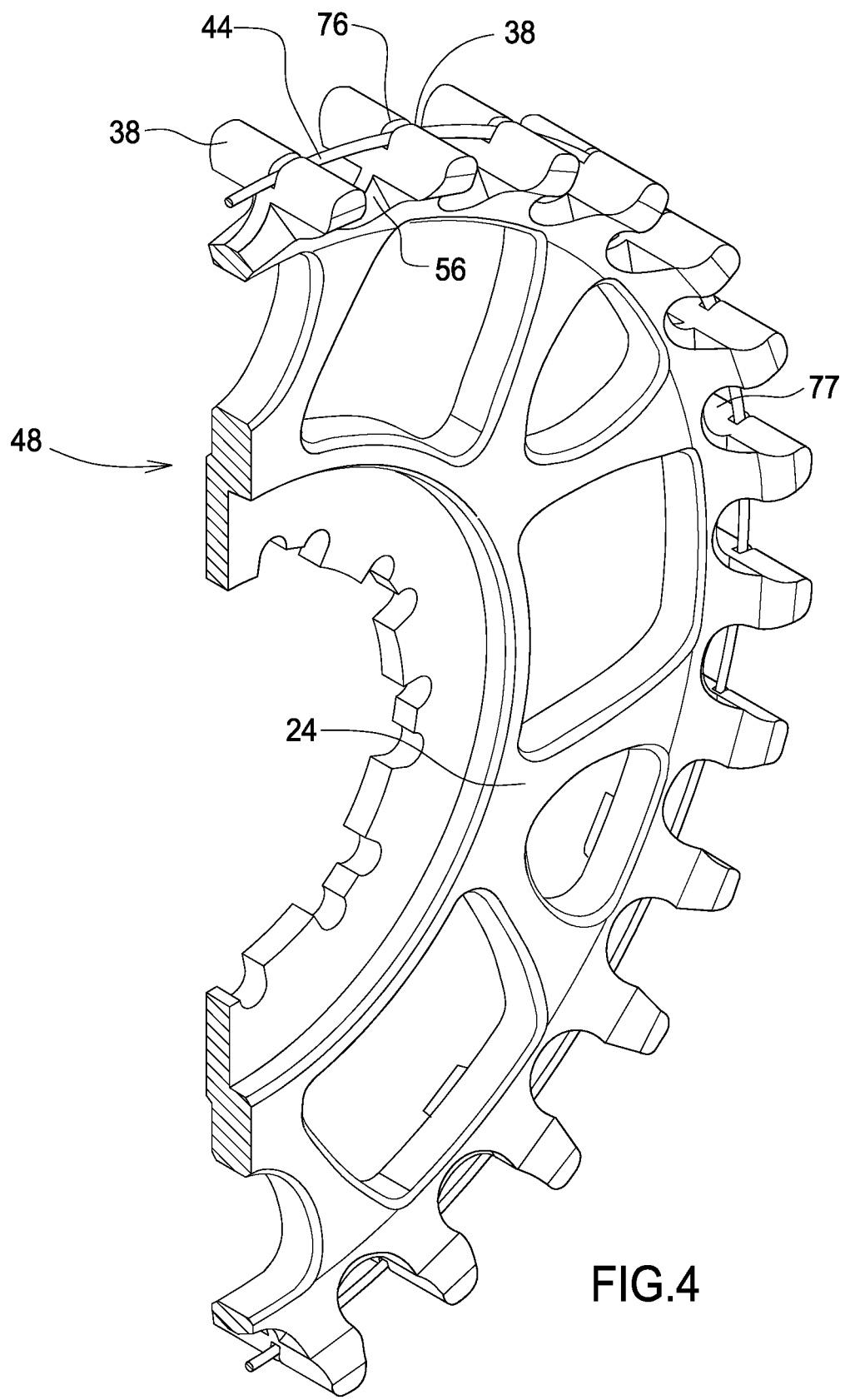
FIG. 4 is a perspective view of the cross-section of FIG. 3.

A further advantage of this design is the ability of mud and debris to be shed in the area of the teeth. This feature is further facilitated by debris evacuating path 56 which extend between each opposing side 32, 34 of the circular outer rim 30 and the alignment member 44, as best viewed in FIGS. 3 and 4. A debris ejecting opening 77 or space extends immediately radially inward of the alignment member between adjacent teeth. Debris ejecting opening 77 extends through the plane of the sprocket. The plane of the sprocket extends normally to a rotational axis. Debris ejecting opening 77 is in communication with the debris ejecting path 56. The debris evacuating path is intended to eliminate obstacles to debris clearing the pulley. The thin cylindrical shape of the alignment member allows the belt alignment function to be accomplished while leaving maximum open space for debris ejection between adjacent teeth. As seen in these figures, the debris evacuating path 56 is inclined from the opposing side to the alignment member 44 in a manner that facilitates clearing of debris and prevents blockage by a shoulder of the pulley rim. A curved surface or other debris shedding configurations could also perform this evacuating function.

Figure 10:
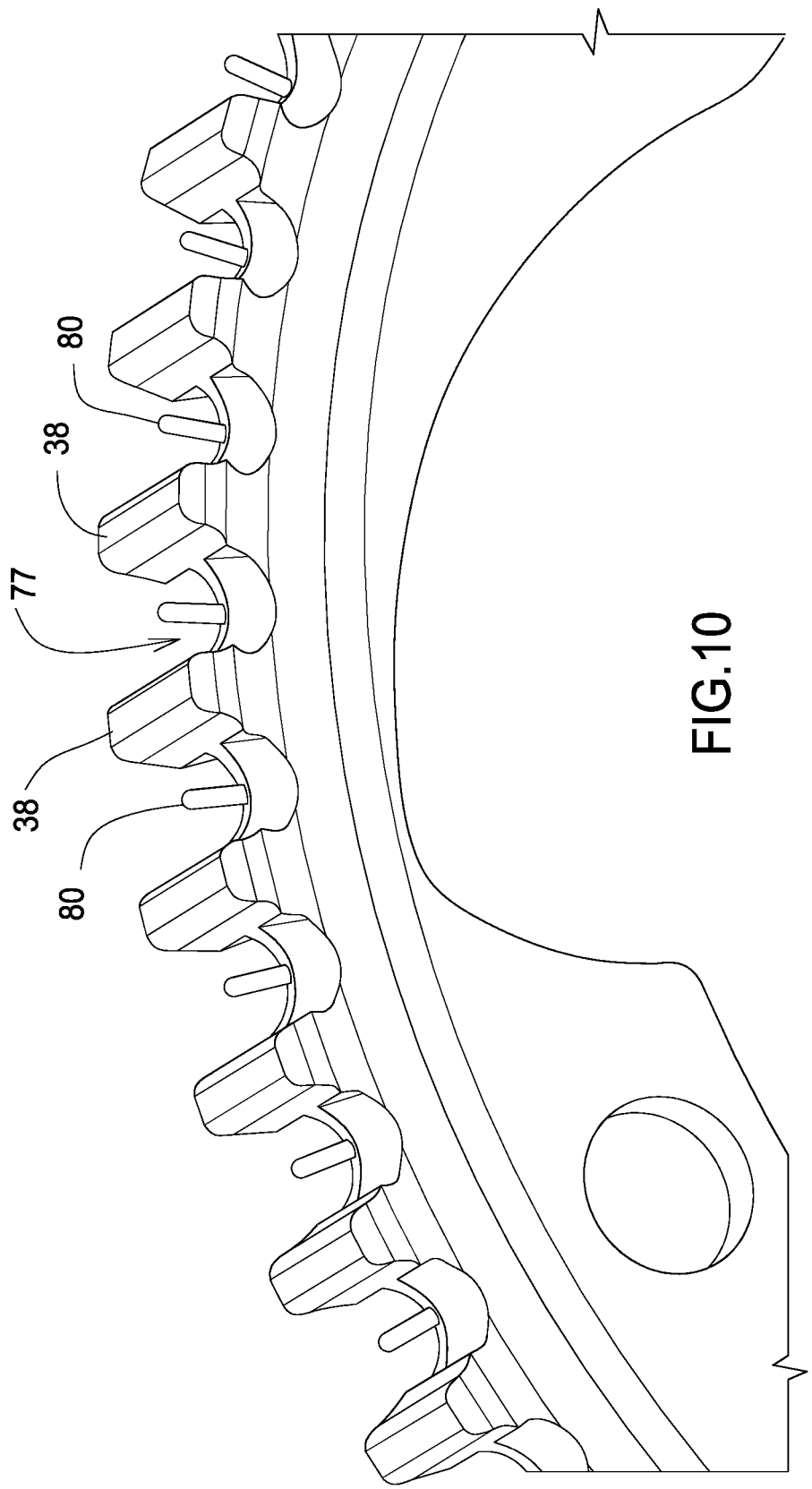
FIG. 10 is a perspective view of an alternate embodiment.

FIG. 10 is a perspective view of an alternate embodiment. In the alternate embodiment projections 80 extend in a radial direction. Projections 80 are elongate and may be cylindrical or of any other suitable cross-section, including oval, rectangular or square. A radial direction can include any angle of zero degrees with respect to a line extending normal to an axis of rotation, up to a line approaching but not parallel to a tangent intersecting said radial. Hence, the range of said angle is up to but not equal to 90 degrees. A projection 80 extends between adjacent teeth 38. Projections 80 extend up to a height which is substantially the same as the radial height of alignment member 44 from axis of rotation 40, see "L" in FIG. 9. Projections 80 cooperatively engage groove 76 in belt 26 in order to keep belt 26 aligned on the sprocket 22 and sprocket 24. Projections 80 may be used on both sprockets 22 and 24, or on only one sprocket.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A pulley and drive belt system comprising:
    a drive belt, the drive belt comprising a plurality of longitudinally spaced lugs each having an alignment groove dividing the lug into first and second lug segments, the alignment groove having an alignment groove depth; and
    at least one pulley configured to engage a surface of the drive belt, the at least one pulley comprising:
    a frame configured to rotate about a rotation axis, the frame having a circular outer rim with opposing sides;
    a plurality of circumferential teeth extending radially and axially of the rim, each tooth having a tooth width and each tooth being configured to be received between adjacent lugs of the drive belt; and
    an alignment member having an elongate endless form and extending between adjacent circumferential teeth tops, the alignment member being configured to be received in the alignment groove, and the alignment member extending no further radially from the rotation axis than the circumferential teeth, a debris ejecting opening disposed radially inward of the alignment member between the circumferential teeth,
    the circumferential teeth, the alignment member and the alignment groove being configured so that with the alignment member received in the alignment groove, the drive belt rides on the circumferential teeth.

2. The pulley and belt drive system of claim 1 further comprising the circumferential teeth, the alignment member and the alignment groove being configured so that with the alignment member received in the alignment groove, the drive belt also rides on the alignment member.

3. The pulley and belt drive system of claim 1 further comprising a debris evacuating path extending between at least one opposing side of the outer rim and the alignment member, the debris evacuating path being free of obstacles between the at least one opposing side of the outer rim and the alignment member.

4. The pulley and belt drive system of claim 1 further comprising the alignment grooves extending longitudinally of the drive belt and the alignment member extending essentially perpendicular to the width of the teeth.

5. The pulley and belt drive system of claim 1 wherein the alignment groove is in the center of the lug and each tooth extends widthwise an equal distance from each rim side.

6. The pulley and belt drive system of claim 1 wherein each tooth extends radially beyond the alignment member from the rotation axis.

7. The pulley and belt drive system of claim 1 wherein the frame of the at least one pulley further comprises a plurality of spokes between the rim and a connection ring, there being an axial off-set of a select distance between the connection ring and the rim, whereby upon attachment of the connection ring to a rotating member a position of the rim along the rotation axis can be varied depending upon which of the opposing rim sides is leading.

8. The pulley and belt drive system of claim 1 comprising at least two pulleys.

9. The pulley and belt drive system of claim 8 wherein each pulley has a different diameter.

10. The pulley and belt drive system of claim 1 further comprising a drive belt having a drive belt width and the alignment groove having an alignment groove width less than ⅓ the drive belt width.

11. The self-aligning pulley and belt drive system of claim 1 further comprising drive belt having a drive belt width and the alignment groove having an alignment groove width less than ¼ the drive belt width.

12. The pulley and belt drive system of claim 1 further comprising drive belt having a drive belt width and the alignment groove having an alignment groove width less than ⅛ the drive belt width.

13. The pulley and belt drive system of claim 1 further comprising drive belt having a drive belt width and the alignment groove having an alignment groove width less than 1/10 the drive belt width.

14. The pulley and belt drive system of claim 1 further comprising a clearance between a width of the alignment groove and a width of the alignment member.

15. The pulley and drive belt system of claim 1 wherein the belt has a width of about 11 mm.

16. A self-aligning pulley and drive belt system comprising:
a drive belt, the drive belt comprising a plurality of longitudinally spaced lugs each having an alignment groove dividing the lug into first and second lug segments, the alignment groove having an alignment groove depth; and
at least one pulley configured to engage the drive belt, the at least one pulley comprising:
a frame configured to rotate about a rotation axis, the frame having a circular outer rim with opposing sides;
a plurality of circumferential teeth extending radially and axially from the rim, each tooth having a tooth width parallel to the rotation axis, and each tooth being configured to be received between adjacent lugs of the drive belt;
an alignment member having an endless elongate form and extending radially between adjacent circumferential teeth, the alignment member being configured to be received in the alignment groove, and the alignment member radially disposed a distance that extends the alignment member into the alignment groove a distance no greater than the alignment groove depth; and
a debris ejecting opening disposed radially inward of the alignment member between the circumferential teeth.

17. A bicycle comprising:
a crank set;
a rear wheel hub; and
a pulley and drive belt system operatively associated with the crank set and the rear wheel hub, the pulley and drive belt system comprising:
a drive belt, the drive belt comprising a plurality of longitudinally spaced lugs each having an alignment groove dividing each lug into first and second lug segments;
a first pulley configured to engage the surface of the drive belt, the first pulley comprising:
a frame configured for connection to the bicycle crank set for rotation about a rotation axis, the frame having a circular outer rim with opposing sides;
a plurality of circumferential teeth extending radially and axially of the rim, the teeth extending axially a tooth width at least equal to a width of the drive belt, and each tooth being configured to be received between adjacent lugs of the drive belt;
a second pulley configured to engage the surface of the drive belt, the second pulley comprising:
a frame configured for connection to the bicycle wheel hub for rotation about a rotation axis, the frame having a circular outer rim with opposing sides;
a plurality of circumferential teeth extending radially and axially of the rim, the teeth extending axially a tooth width at least equal to a width of the drive belt, and each tooth being configured to be received between adjacent lugs of the drive belt; and
at least one of the first and second pulleys further comprising an alignment member having a wire form and extending between adjacent circumferential teeth, the alignment member being configured to be received in the alignment groove, a debris ejecting opening disposed radially inward of the alignment member between the circumferential teeth.

18. A pulley for use with a drive belt, the drive belt comprising a plurality of longitudinally spaced lugs each having an alignment groove dividing each lug into first and second lug segments, the pulley comprising:
a frame configured to rotate about a rotation axis, the frame having a circular outer rim with opposing sides;
a plurality of circumferential teeth extending radially and axially of the rim, each tooth having a tooth width at least equal to a width of the drive belt, and each tooth being configured to be received between adjacent lugs of the drive belt; and
an alignment member having a wire form and extending between adjacent circumferential teeth, the alignment member being configured to be received in the alignment groove, the alignment member extending radially no further than the circumferential teeth from the rotation axis, a debris ejecting opening disposed radially inward of the alignment member between the circumferential teeth.

19. The pulley for use with a drive belt of claim 18 further comprising a debris evacuating path extending between at least one opposing side of the outer rim and the alignment member, the debris evacuating path being free of obstacles between the at least one opposing side of the outer rim and the alignment member.

20. The pulley for use with a drive belt of claim 18 further comprising the alignment member having a width less than ⅓ the width of the teeth.

21. The pulley for use with a drive belt of claim 18 further comprising the alignment member having a width less that ¼ the width of the teeth.

22. The pulley for use with a drive belt of claim 18 further comprising the alignment member having a width less than ⅛ the width of the teeth.

23. The pulley for use with a drive belt of claim 18 further comprising the alignment member having a width less than 1/10 the width of the teeth.

24. A kit for a bicycle comprising:
a drive belt, the drive belt comprising a plurality of longitudinally spaced inner lugs each having a an alignment groove dividing each lug into first and second lug segments, alignment groove having an alignment groove depth; and
a first and a second pulley, each of the first and second pulleys being configured to engage a surface of the drive belt, at least one of the first and second pulleys comprising:
a frame having a circular outer rim with opposing sides;
a plurality of circumferential teeth extending radially and axially of the rim, each tooth having a width parallel to the rotation axis, and each tooth being configured to be received between adjacent lugs of the drive belt; and an alignment member having an elongate wire form and extending between adjacent circumferential teeth in a radial direction, the alignment member being configured to be received in the alignment groove, and the alignment member extending no further radially than the top of the circumferential teeth from the rotation axis, the circumferential teeth, the alignment member and the alignment groove being configured so that with the alignment member received in the alignment groove, the drive belt rides on the circumferential teeth.

\* \* \* \* \*